US010709142B2

(12) United States Patent
Gallon et al.

(10) Patent No.: US 10,709,142 B2
(45) Date of Patent: Jul. 14, 2020

(54) SYSTEM AND METHOD FOR THE PERSONALIZED PRODUCTION OF FOODS

(71) Applicant: My G Pizza S.R.L., Padua (IT)

(72) Inventors: Federico Gallon, Padua (IT); Caterina Pettenello, Padua (IT); Giorgia Gallon, Padua (IT); Giacomo Gallon, Padua (IT)

(73) Assignee: MY G PIZZA S.R.L., Padua (IT)

( * ) Notice: Subject to any disclaimer, the term of this patent is extended or adjusted under 35 U.S.C. 154(b) by 272 days.

(21) Appl. No.: 15/527,835

(22) PCT Filed: Aug. 26, 2015

(86) PCT No.: PCT/IB2015/056459
§ 371 (c)(1),
(2) Date: May 18, 2017

(87) PCT Pub. No.: WO2016/079610
PCT Pub. Date: May 26, 2016

(65) Prior Publication Data
US 2017/0318821 A1 Nov. 9, 2017

(30) Foreign Application Priority Data
Nov. 20, 2014 (IT) .............................. BO2014A0655

(51) Int. Cl.
*A21B 1/42* (2006.01)
*A21B 7/00* (2006.01)
(Continued)

(52) U.S. Cl.
CPC ................ *A21D 13/40* (2017.01); *A21C 9/04* (2013.01); *A21C 9/08* (2013.01); *A21C 15/002* (2013.01); *A23L 5/10* (2016.08); *A23V 2002/00* (2013.01)

(58) Field of Classification Search
CPC ....... A47J 37/00–046; A21B 7/00–005; A21B 1/42–50
See application file for complete search history.

(56) References Cited

U.S. PATENT DOCUMENTS 5,832,814 A 11/1998 Nakatani
5,967,023 A 10/1999 Acknin et al.
(Continued)

FOREIGN PATENT DOCUMENTS

EP 1388286 2/2004
GB 2390525 1/2004
(Continued)

OTHER PUBLICATIONS

International Search Report for PCT/IB2015/056459 dated Dec. 7, 2015 (3 pages).

*Primary Examiner* — Michael A Laflame, Jr.
(74) *Attorney, Agent, or Firm* — Tutunjian & Bitetto, P.C.

(57) ABSTRACT

A system for the personalized production of foods including an automated selection station of the type of food requested by the customer, including the relative topping, and of the method of preparation thereof, a preparation station of the dough portions (P) that constitute the base of the requested foods (X,X'), a first topping station of the dough portions (P) with ingredients to be cooked, a cooking station of the dough portions (P) with ingredients to be cooked, a delivery station to the customer of the finished foods (X'), means (IS) for transporting the dough portions (P) and/or the foods (X,X') through the stations. The first topping station includes a counter with worker and a selection counter of the ingredients to be cooked freely accessible to the customers; the transportation means include a sorting device of the dough portions (P) towards the counter with worker or towards the selection counter.

8 Claims, 3 Drawing Sheets

(51) Int. Cl.
*A21D 13/40* (2017.01)
*A21C 9/04* (2006.01)
*A21C 9/08* (2006.01)
*A21C 15/00* (2006.01)
*A23L 5/10* (2016.01)

(56) References Cited

U.S. PATENT DOCUMENTS

| | | | | |
|---|---|---|---|---|
| 2007/0100495 | A1* | 5/2007 | Simmons | G06Q 99/00 |
| | | | | 700/233 |
| 2008/0163762 | A1* | 7/2008 | Weiss | A21B 1/48 |
| | | | | 99/443 C |
| 2010/0212516 | A1 | 8/2010 | Westberg | |
| 2015/0230657 | A1* | 8/2015 | Marco | A47J 36/027 |
| | | | | 426/549 |

FOREIGN PATENT DOCUMENTS

| | | |
|---|---|---|
| WO | 01/67869 | 9/2001 |
| WO | 2013/033586 | 3/2013 |

* cited by examiner

SYSTEM AND METHOD FOR THE PERSONALIZED PRODUCTION OF FOODS

TECHNICAL FIELD OF THE INVENTION

The present invention concerns a system and method for the personalized production of foods.

More specifically, the invention concerns a system and method for the personalized production of foods such as pizzas, focaccia bread, and the like.

STATE OF THE ART

In all urban areas it is very common to find shops that sell so-called take-away pizza, or other foods of similar characteristics, such as filled focaccia bread and more.

Normally, even the simplest of such shops—with particular reference to the preparation and sale of pizzas—comprise the counter where the pizza chef prepares the dough and tops it with the ingredients, the baking oven and the till.

Usually, the shop has a menu with some preselected pizza toppings, or the customer can of course opt for personalised or made-to-order toppings, if available. Such shops are often very small, and two or three people work there at most.

At some times of day, or on certain days, like for example the weekend, the amount of customers in such shops substantially increases, and consequently the waiting times of the single customer to receive the requested product increase.

Moreover, in some cases the choice of personalised toppings, in addition to those already preselected by the manager, can be difficult and complicated since the customer does not know which ingredients are actually available at that time, and therefore it can itself cause further delays that have a further impact upon the waiting times to deliver the products to the queuing customers.

For the manager of the shop, such drawbacks can sometimes have a substantial impact on earnings, or even on the quality of the product supplied to the single customer.

WO 2013/033586 A1 refers to an automated system for making pizzas for retail outlets.

Such a system comprises: a transportation robot or a transfer device for moving each pizza-carrying tray through the various stations of the machine; a preparation station of the dough portions that constitute the base of the requested foods, which in turn is made up of a shelving station and a pressing station; a station for dispensing tomato sauce on the prepared dough portions; a topping station with cheese; a topping station with other ingredients, for example peppers; a baking oven; weighing means associated with the platforms that support the trays at the different stations, for better control of the ingredients delivered; a central processing unit that controls the operation of the various components of the system; a selection station, with relative display, of the characteristics of the pizza to be made; a delivery station of the finished products to the customers.

SUMMARY OF THE INVENTION

The technical task of the present invention is to improve the state of the art.

In such a technical task, a purpose of the present invention is to provide a system and method for the personalized production of foods that allows the drawbacks described above to be overcome.

Yet another purpose of the present invention is to provide a system and method for the personalized production of foods that allows finished foods to be provided that are of high and consistent quality at low cost and with drastically reduced waiting times for the single customer with respect to conventional shops.

A further purpose of the present invention is to provide a system and method for the personalized production of foods that ensures maximum versatility for the customer in terms of the characteristics of the food able to be obtained.

Such a task and such purposes are all accomplished by the system for the personalized production of foods according to the present application.

The system for the personalized production of foods such as pizzas and focaccia bread according to the invention comprises at least one automated selection station of the type of food requested by the customer, possibly including the relative topping, and of the method of preparation thereof, at least one preparation station of dough portions that constitute the base of the requested foods, at least one first topping station of the dough portions with ingredients to be cooked, at least one cooking station of the dough portions with ingredients to be cooked, at least one delivery station of the finished foods to the customer, means for weighing the dough portions and/or the foods, means for transporting the dough portions and/or the foods through the aforementioned stations, means for recognising the dough portions and/or the foods, associated with a certain customer, through such stations, at least one central processing unit to which the stations, the transportation means, the weighing means and the recognition means are slaved.

The aforementioned first topping station comprises a counter with worker, and also a selection counter of the ingredients to be cooked freely accessible to the customers.

According to an aspect of the invention, the aforementioned transportation means comprise a sorting device that selectively sends the dough portions towards the counter with worker or towards the selection counter of the ingredients, in relation to the selection made by the customer.

Thanks to this characteristic it is possible to direct the single dough portions in an automated, and therefore quick and efficient manner, to the counter with worker in the case in which the customer wishes the topping of his/her dough portion to be carried out by the worker personally in a conventional manner, or, alternatively, to the selection counter of the ingredients in the case in which the customer has decided to carry out the topping of his/her dough portion autonomously.

This allows the customer to actively intervene in the preparation of his/her food, a situation that does not happen at all in known systems.

Moreover, such a task and such purposes are all accomplished by the method for the personalized production of foods according to the present application. The method for the personalized production of foods such as pizzas and focaccia bread according to the invention comprises the steps of the customer selecting the method of preparation of the requested food, i.e. with the help of a worker or autonomously, selecting the number of foods required, the type thereof and possibly the requested topping ingredients, defining a reference of the customer to be associated with the food in preparation for recognition in the subsequent operative steps, preparing a dough portion corresponding to the food requested, topping the dough portion with the ingredients to be cooked, such a step being carried out by the worker or alternatively by the customer, cooking the dough portion topped with the ingredients to be cooked, obtaining a cooked food, further topping the cooked food with ingredients to be used after cooking and obtaining a finished food, such a step being carried out by the worker or alternatively by the customer, delivering the finished food to the customer and collecting payment at the till.

According to the invention, the method also comprises a step of sorting the dough portion provided in the previous preparation step, towards the worker or towards the customer to carry out the aforementioned step of topping the dough portion itself with the ingredients to be cooked.

The present application refers to advantageous embodiments of the invention.

BRIEF DESCRIPTION OF THE DRAWINGS

These and further advantages will become clear to those skilled in the art from the following description and from the attached drawings, given as a non-limiting example, in which.

DETAILED DESCRIPTION OF THE INVENTION

Figure 1:
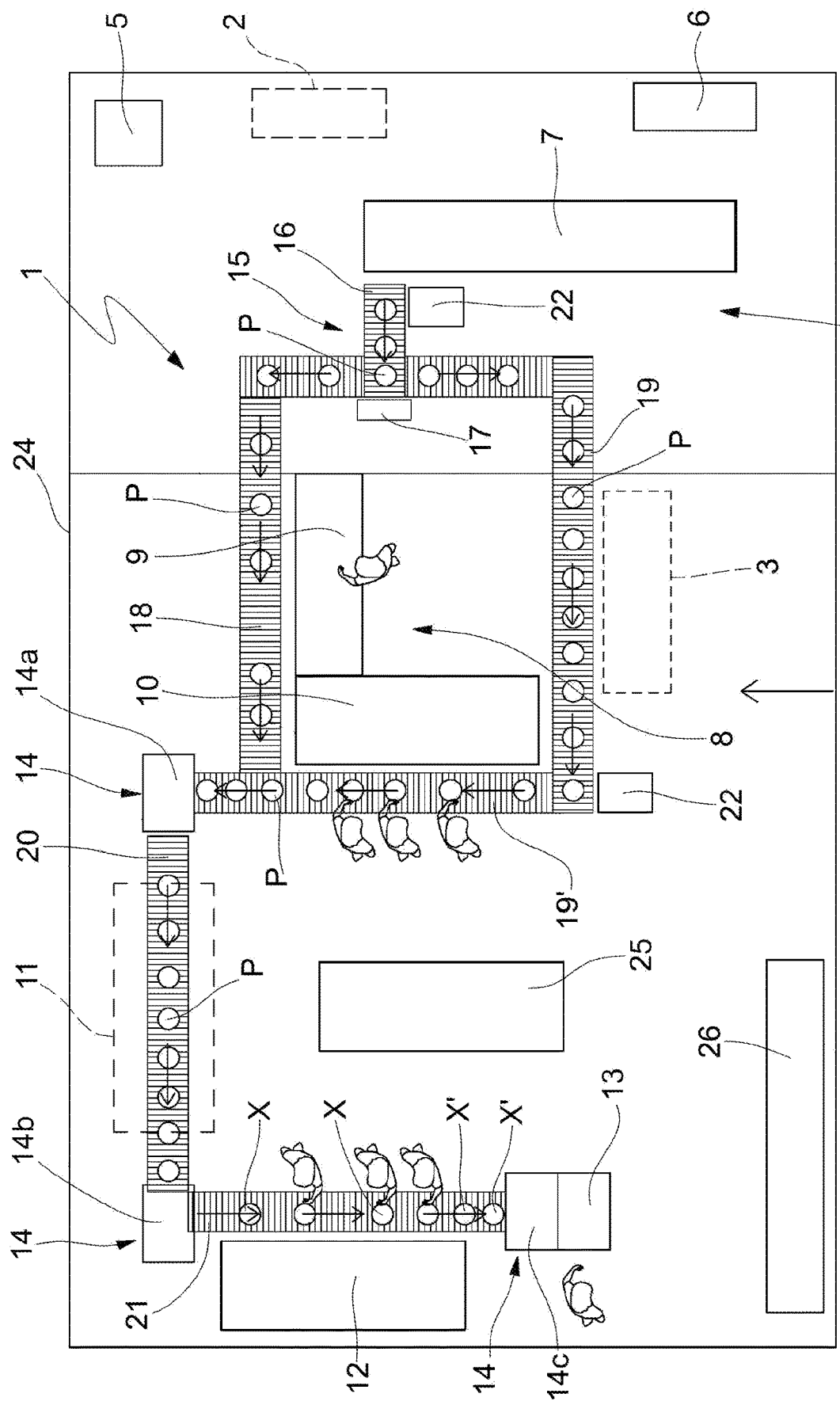
FIG. 1 is a schematic plan view of the system according to the invention.

With reference to FIG. 1, a system for the personalized production of foods according to the present invention is wholly indicated with 1, only for indicating and not limiting purposes.

The system 1 according to the invention is devised preferably, but not exclusively, for the personalized production of foods such as pizzas and focaccia bread.

This does not mean that the system 1 cannot be effectively used for the personalized production of foods of another type, without particular limitations to the purposes of the present invention.

The system 1 is suitable for being installed inside a building—a shop, a depot, or similar, which the customers can freely access, at least in the permitted areas.

The system 1, which as will be seen hereafter has operation that can be defined as semi-automated, comprises a central processing unit 2 to which all of the stations of the system 1 itself are slaved, and which manages and controls all of the operative steps thereof.

The central processing unit 2 can comprise, or consist of, a programmable logic controller (PLC) or other similar device.

According to an aspect of the invention, the system 1 comprises at least one automated selection station 3 of the type of food requested by the customer, including the relative topping, and of the method of preparation thereof.

In this selection station 3 the customer can firstly decide the method of preparation of the food, i.e. whether it must be carried out by the worker—for example the pizza chef—or whether he/she will prepare the food himself/herself, as will become clearer hereafter.

Moreover, in this automated selection station 3 the customer can indicate the number of foods required, and their type, for example normal pizza or giant pizza. In such a selection station 3, the customer indicates his/her own reference, for example his/her name, initials, or similar.

In a preferred embodiment of the invention, the automated selection station 3 comprises at least one user interface through which the customer can define the required characteristics of the food, select the method of preparation thereof, and indicate his/her reference.

The aforementioned user interface can for example consist of a personal computer, a simple touch screen monitor, or similar.

According to another aspect of the invention, the system 1 comprises at least one preparation station 4 of dough portions P, which constitute the base of the requested foods.

The preparation station 4 can comprise at least one kneading machine 5, warming cabinets and proving chambers 6 and at least one sheeting machine 7.

In particular, the dough portions P of the desired shape for the preparation of pizzas, focaccia bread and similar come out from the sheeting machine 7.

The preparation station 4 can be completely automated, also foreseeing transportation means between one machine 5,6,7 and the other, or it can be semiautomatic with partial intervention of the workers in carrying out the various operative steps.

According to another aspect of the invention, the system 1 comprises at least one first topping station 8 of the dough portions P, coming from the preparation station 4, with ingredients to be cooked.

The selection of the method of preparation of the food carried out by the customer, i.e. autonomous or with the help of the worker, essentially influences only the operativity of the first topping station 8.

The first topping station 8 indeed comprises, in greater detail, a counter with worker 9.

The counter with worker 9 can, for example, typically, be the pizza chefs counter.

In the counter with worker 9 the food is prepared manually with all of the ingredients to be cooked indicated by the customer in the selection station 3. The first topping station 8 also comprises a selection counter 10 of the ingredients to be cooked, freely accessible to the customers.

In such a selection counter 10 the customers can freely top the dough portions P coming from the preparation station 4 with the desired ingredients to be cooked, and also in the desired amounts.

Therefore, it is an active intervention of the customers in the preparation of the pizzas, which is not foreseen in known systems (be they industrial or retail) nor in the small shops preparing and selling pizzas.

As will be described more clearly hereafter, the selection made by the customer concerning the method of preparation of the food determines the transportation of the dough portions P coming from the preparation station 4 respectively towards the counter with worker 9, or towards the selection counter 10.

At the selection counter 10 there can be devices such as tomato and mozzarella dosers in the case of pizza, and hygienic means such as paper napkins, gloves, etc. According to yet another aspect of the invention, the system 1 comprises at least one cooking station 11 of the dough portions P with ingredients to be cooked.

The cooking station 11 comprises at least one conveying tunnel oven, or other equivalent type of oven.

Both the dough portions P coming from the counter with worker 9, and the dough portions P coming from the selection counter 10 enter into the cooking station 11. From the cooking station 11, cooked foods X come out that, as described hereafter, can possibly undergo further topping interventions thus becoming finished foods X'.

According to yet another aspect of the invention, the system 1 comprises a second topping station 12 with ingredients to be used after cooking.

In this station the customer, after cooking, can autonomously top his/her dough portion P with ingredients as desired to be used after cooking.

The system 1 also comprises a delivery station 13 of the finished food to the customer.

The delivery station 13 comprises for example the till to carry out the payment, and possibly also a packaging/boxing area of the foods being delivered.

According to an important aspect of the—invention, the system 1 comprises weighing means 14 of the dough portions P and/or of the finished foods X'.

In greater detail, said weighing means 14 comprise a first weighing station 14*a* positioned upstream of the cooking station 11.

The weighing means 14 also comprise a second weighing station 14*b* positioned downstream of the cooking station 11.

The weighing means 14 also comprise a third weighing station 14*c* positioned downstream of the second topping station 12.

The specific function of the weighing means 14 will be made clearer hereafter.

The system 1 comprises transportation means, wholly indicated with 15, of the dough portions P, of the cooked foods X and of the finished foods X' through the stations 4,8,11,12,13 of the system 1 itself.

The transportation means 15, in greater detail, comprise a first conveyor 16 that transports the dough portions P from the preparation station 4 towards the first topping station 8.

The transportation means 15 also comprise, according to another aspect of the invention, a sorting device 17. The sorting device 17 is suitable for selectively sending the dough portions P coming from the preparation station 4 towards the counter with worker 9 or towards the selection counter 10, in relation to the selection made by the customer.

The sorting device 17 is positioned downstream of the first conveyor 16.

The transportation means 15 also comprise a second conveyor 18 and a third conveyor 19.

The second conveyor 18 and the third conveyor 19 specifically transport the dough portions P, selected by the sorting device 17, respectively towards the counter with worker 9 or towards the selection counter 10.

The second conveyor 18 and the third conveyor 19 can have any configuration; in the embodiment of the invention represented in the figures, the second conveyor 18 and the third conveyor 19 are made converging into a single area, to then proceed towards the subsequent stations.

In greater detail, the third conveyor 19 is substantially L-shaped in plan, and has a portion 19' positioned along the selection counter 10: in other words, the dough portions P that must be applied as topping directly by the customers, taking the ingredients from the selection counter 10, move along the portion 19' of the third conveyor 19.

As illustrated in FIG. 1, the first conveyor 18 and the second conveyor 19 are arranged, in plan, for example so as to constitute a rectangle, inside which are the counter with worker 9 and the selection counter 10: the spaces available are thus optimised, and access to the ingredients present in the selection counter 10 is granted both to the worker (pizza chef) and to the customers.

The transportation means 15 also comprise a fourth conveyor 20.

The fourth conveyor 20 has the specific function of conveying the dough portions P coming from the first topping station 8 (i.e. coming from the first conveyor 18 or from the portion 19' of the second conveyor 19) through the cooking station 11.

Between the second and the third conveyor 18, 19 (i.e. in detail the area of convergence thereof) and the fourth conveyor 20 the first weighing station 14*a* is foreseen.

Downstream of the fourth conveyor 20, on the other hand, the second weighing station 14*b* is foreseen.

The transportation means 15 also comprise a fifth conveyor 21.

The fifth conveyor 21 has the specific function of conveying the cooked foods X, coming from the cooking station 11, through the second topping station 12 and towards the delivery station 13.

The fifth conveyor 21 is positioned downstream of the second weighing station 14*b*; downstream of the fifth conveyor 21 is the third weighing station 14*c*, and thereafter the delivery station 13.

According to another aspect of the invention, the system 1 comprises recognition means 22 of the dough portions P and/or of the cooked foods X or finished foods X', associated with a given customer, through the stations 4, 8,11,12,13.

The recognition means 22 comprise a plurality of containers, able to be associated with the dough portions P and/or with the cooked foods X or finished foods X', equipped with respective identifiable elements, and a plurality of readers of the aforementioned identifiable elements positioned in predetermined points of the system 1.

In an embodiment of particular practical interest, the aforementioned identifiable elements comprise a barcode associated with a respective container; the readers of the recognition means 22 thus consist of barcode readers.

In other embodiments of the invention, the identifiable elements could be of the RFID type, or of another equivalent type.

The containers consist, for example, of baking trays, or similar, inside which the respective dough portions P or foods X, X' are housed through all of the stations 4, 8,11,12,13 of the system.

The system 1 can be set up inside a building 24, where there can be other accessories like for example a drinks machine 25 or a dining area 26.

In some embodiments of the system 1 according to the invention, the automated selection station 3 can be associated with a server on which, for example, a web page is active that is accessible to the customers and that allows them to consult the available ingredients and/or to possible make orders remotely, also requesting home delivery.

As far as the autonomous method of preparation by the customer is concerned, it should be observed that there can be, along the system 1, indications on the recommended doses for the main ingredients (for example tomato and mozzarella for pizza).

Of course, there can be, in the management of the operation of the system 1, verification procedures that allow foods that, for whatever reason, have generated an error or alarm signal in the control system, to be automatically discarded.

The operation of the system 1 according to the invention, in light of what is described, is totally intuitive.

Indeed, the customer, at the selection station 3, defines at least the method of preparation of the food, the number of foods requested and the type (in particular in relation to the format).

Moreover, if the preselected method is by means of the worker (pizza chef), the customer also defines in advance the ingredients with which he/she wishes for the food X,X' to be prepared.

Each product selected by the customer is then associated with a code, which will then correspond to the identifiable element present on the respective container, so that the food is unequivocally identified along all of the stations of the system 1.

In the preparation station 4 the corresponding dough portion P is then prepared, which is arranged in the respective container assigned.

Through the first conveyor 16 and the sorting device 17, the dough portion P in question is directed either towards the counter with worker 9—through the second conveyor 18—or towards the selection counter 10—through the third conveyor 19—in relation to the method selected by the customer.

In the first case, the worker—for example the pizza chef—takes care of completely topping the dough portion P in question with the ingredients to be cooked requested by the customer.

Moreover, in this first case, the economic value V3 of the finished food X' is already calculated, which must be paid by the customer at the till.

In the second case, it is the customer him/herself, warned by a suitable voice/sound signal, who entirely takes care of topping the dough portion P in question with the desired ingredients to be cooked.

Upon exiting the counter with worker 9, or upon exiting the selection counter 10, the dough portion P in question is weighed in the first weighing station 14a. A first weight P1 of the dough portion P is thus determined.

In the case of preparation with the help of a worker, such a first weight P1 will conventionally be assigned value 0, since the economic value of the product was determined previously.

In the case of autonomous preparation by the customer, such a value P1 will be assigned a first economic value VI, which corresponds to the economic value of the dough portion P topped with foods to be cooked according to the operations of the customer.

At the end of the weighing in the first station 14a, the dough portion P in question enters into the cooking station 11.

It is foreseen that the dough portion P remains inside the cooking station 11 for a predetermined and constant time period for all types of foods, for example three minutes.

A cooked food X comes out from the cooking station 11, which is weighed the second weighing station 14b.

The second weight P2 of the cooked food X is thus determined, which obviously is less than the first weight PI of the topped dough portion P that entered into the cooking station 11.

In the case in which the dough portion P has been prepared with the help of the worker, such a second weight P2 will conventionally be assigned the value 0, for the reasons outlined earlier.

After the weighing in the second weighing station 14b, the cooked food X proceeds towards the second topping station 12, where the same worker/pizza chef, or the same customer, possibly again warned by a suitable signal, takes care of further topping the cooked food X with the desired ingredients to be used after cooking. Upon exiting the second topping station 12, the finished food X' thus created reaches the third weighing station 14c.

The third weight P3 of the finished food X' is thus determined.

In the case in which the dough portion P has been prepared with the help of the worker, such a third weight P3 will conventionally be assigned the value 0, for the reasons outlined earlier.

In the case in which the dough portion P has been prepared autonomously by the customer, the difference between P3 and P2 is attributed a second economic value V2, which corresponds to the economic value of the ingredients to be added after cooking inserted by the customer.

The third economic value V3, or final value, of the finished food X' is thus given by the sum of VI and V2. In the delivery station 13 the payment of the products by the customer and their possible packaging/boxing then takes place.

An object of the present invention is also a method for the personalized production of foods, preferably but not exclusively carried out with the system 1 according to the present invention.

Figure 2:
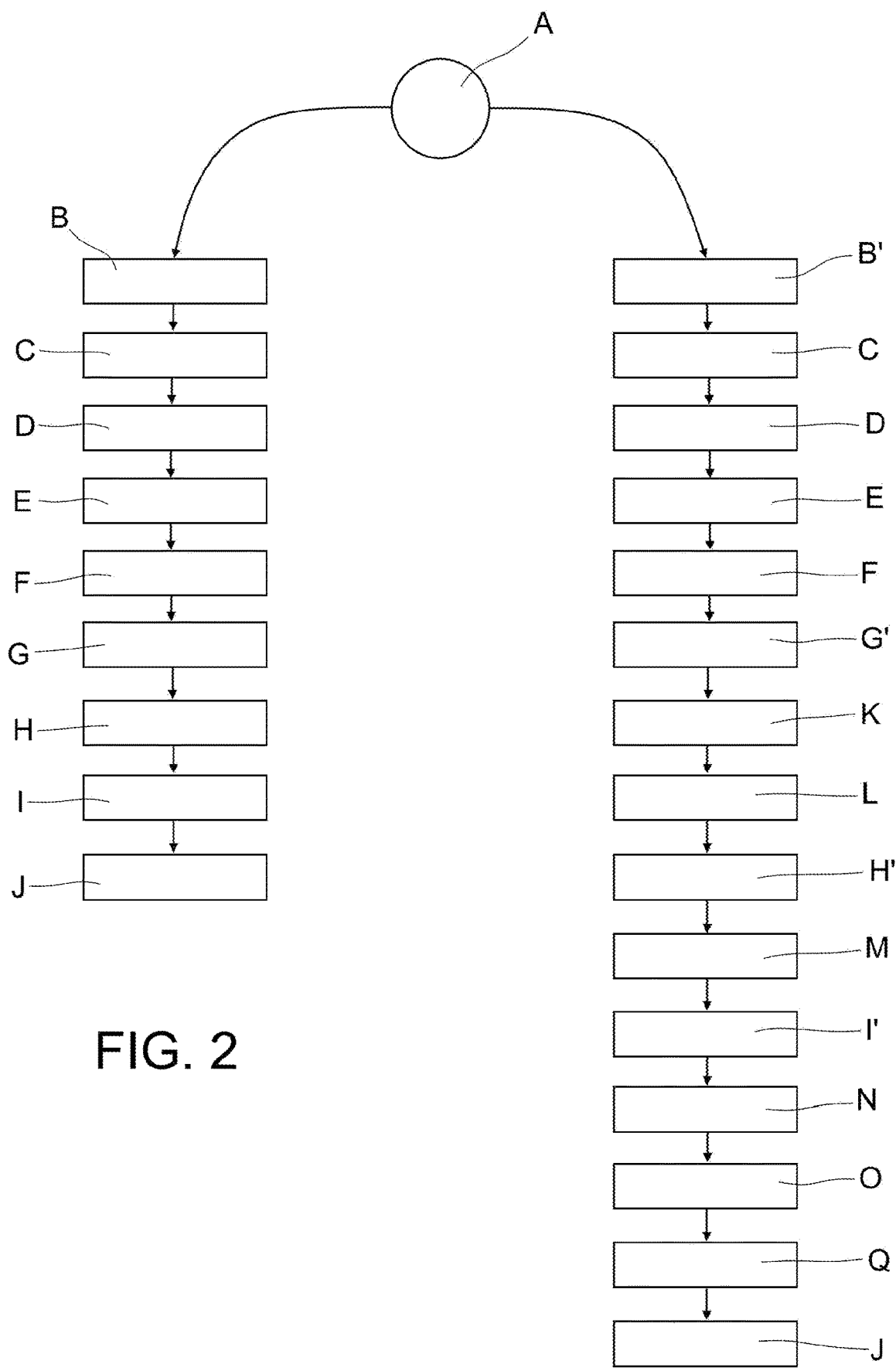
FIG. 2 is a flow diagram schematically illustrating the operative steps of the method according to the present invention.

In order to better understand method, we refer to the flow diagram of FIG. 2.

The method according to the invention foresees a first step A, or preliminary step, of the customer selecting the method of preparation of the requested food, i.e. with the help of a worker or autonomous.

In the case in which the customer selects the method of preparation with the help of a worker (left branch of the flow diagram illustrated in FIG. 2), a step B is foreseen of selecting the number of foods required, the type thereof and the name, the latter meaning the combination of ingredients required on the food itself. Moreover, there is a step C of defining a reference of the customer to be associated with the food being prepared.

There is also a step D of assigning an economic value to the food requested by the customer.

Then there is a step E of preparing a dough portion P corresponding to the requested food, and a step F of assigning a unique code to the same dough portion P, for recognition in the subsequent steps of the method. The method then comprises a subsequent step G of topping the dough portion P with the ingredients to be cooked indicated by the customer in the previous step B.

In detail, the topping step G is carried out by the worker.

Then there is a step H of cooking the dough portion P topped with the ingredients indicated by the customer. The method then foresees a step I of further topping the cooked food X with ingredients to be used after cooking.

In detail, step I is also carried out by the worker. Finally, the method foresees a final step J of delivering the finished food X' to the customer and of receiving payment at the till.

On the other hand, in the case in which the customer selects the autonomous method of preparation (right branch of the flow diagram illustrated in FIG. 2), there is a step B' of selecting the number of foods required, and the type thereof.

Then follow steps C, D, E, F as in the previous case.

Then there is a step G' of topping the dough portion P with ingredients to be cooked selected by the customer; in detail, step G' is carried out by the customer him/herself.

Then there is a step K of first weighing of the dough portion P topped with ingredients to be cooked, so as to determine a first weight P1.

Then there is a step L of associating such a weight P1 with a first economic value VI, which corresponds to the economic value of the dough portion P topped with foods to be cooked according to the operations of the customer.

Then there is a step H' of cooking the dough portion P topped with the ingredients inserted by the customer. At the end of the cooking step, there is a step M of weighing the cooked food X, thus determining a second weight P2.

The method then foresees a step I' of further topping the cooked food X with ingredients to be used after cooking.

In detail, step I' is also carried out by the customer. At the end of this further topping step, there is a step N of weighing the finished food X', thus determining a third weight P3.

The method then comprises a step O of associating a second economic value V2 with the difference between P3 and P2, which corresponds to the economic value of the ingredients to be added after cooking inserted by the customer.

Then there is a step Q of calculating the final economic value V3 of the cooked food X' by the sum of VI and V2.

The method foresees a final step J of delivery of the finished food X' to the customer and of payment at the till.

Figure 3:
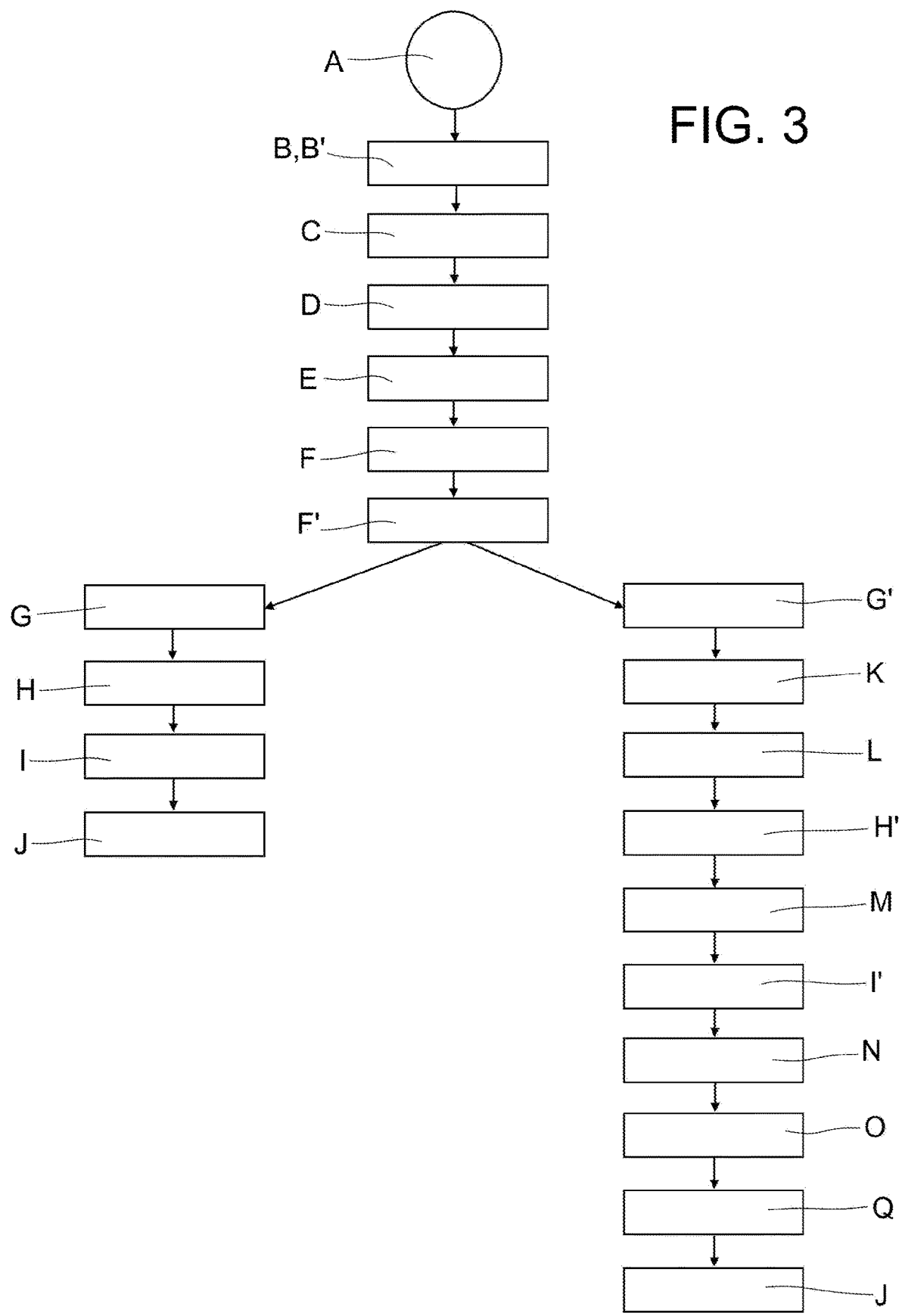
FIG. 3 is a flow diagram schematically illustrating the operative steps of the method according to the present invention, in another embodiment.

FIG. 3 represents a flow diagram that refers to a further preferred embodiment of the method according to the invention.

The method according to this embodiment initially comprises the steps A, B, B', C, D, E, F as described in the previous embodiment.

In particular, in the case in which the customer selects the method of preparation with the help of a worker, there is a step B of selecting the number of foods required, the type thereof and the name, the latter meaning the combination of ingredients required on the food itself; or, in the case in which the customer selects the autonomous method of preparation, there is a step B' of selecting the number of foods required, and the type thereof.

In this embodiment of the method, there is also a step of sorting F' the dough portion P, arranged in the previous preparation step E, towards the worker or towards the customer to carry out the step of topping G,G' the dough portion P with the ingredients to be cooked.

In the particular case in which this embodiment of the method is carried out specifically with the system 1 according to the present invention and described earlier, the aforementioned step of sorting F' the dough portion P is carried out through a sorting device 17 having the characteristics described earlier, and forming part of the transportation means 15 that convey the foods P, X, X' through the various stations of the system 1.

In greater detail, the sorting device 17 is suitable for selectively sending the dough portions P to the counter with worker 9 or to the selection counter 10, in relation to the specific selection made by the customer.

The step F' of sorting the dough portions P towards the worker or towards the customer constitutes a decisional node in the method according to the present embodiment. Indeed, in the case in which the customer selects the method of preparation with worker (left branch of the flow diagram of FIG. 3), the method proceeds with steps G, H, I, J described in the previous embodiment.

In the case in which the customer selects the autonomous method of preparation (right branch of the flow diagram of FIG. 3), the method proceeds with steps G', K, L, H', M, I', N, O, Q, J described in the previous embodiment.

It has thus been seen how the invention achieves the proposed purposes.

The system and method of production according to the invention firstly make it possible to at least partially automate a method that, in many situations, is still entirely manual, with obvious reductions in the production times necessary per single food.

Consequently, the waiting time per single customer in the shop can be substantially limited.

It should be observed that the at least partial automation of the production method can also make it possible to reduce the production costs per single food, and therefore to increase the profit margins for the manager.

From the customer's point of view, the at least partial automation of the method ensures a constant and verified quality of the food produced.

Moreover, in an absolutely innovative and advantageous aspect, the customer, in the case of selection of an autonomous method of preparation, can prepare in an absolutely personalised manner, and by their own hand, the food, inserting all of the desired ingredients and in the desired amount, without any limitation.

All of this is still carried out in a partially automated method, and thus that uses professional equipment, with clear advantages in terms of time and quality.

Therefore, substantially, a result similar to that which the customer—expert in the preparation of these foods—could obtain at their own home, can be obtained without however having to use their own tools and without having to spend a lot of time doing so.

The present invention has been described according to preferred embodiments, but equivalent variants can be devised without departing from the scope of protection offered by the following claims.

In the case in which the technical characteristics mentioned in the attached claims are followed by reference numerals, such reference numerals are introduced with the sole purpose of increasing the clarity of the claims and consequently the aforementioned reference numerals do not have a limiting effect on the interpretation of each element identified as an example by such reference numerals.

The invention claimed is:

1. A system for the personalised production of foods such as pizza, focaccia bread and the like, comprising:
   at least one automated selection station of the type of food required by the customer, including the relative topping, and of how it is to be prepared, at least one preparation station of dough portions (P) that make up the base of the foods (X,X') required, at least one first topping station of the dough portions (P) with ingredient to be cooked;
   at least one cooking station of the dough portions (P) with ingredients to be cooked;
   at least one delivery station to the customer of the finished foods (X');
   a first weighing station of the dough portions (P) and/or of the foods (X,X'), positioned upstream of said cooking station;
   a plurality of baking trays, able to be associated with said dough portions and/or with said finished foods associated with a certain customer, equipped with respective identifiable elements, and a plurality of readers of said identifiable elements positioned at predetermined points of the system;
   at least one central processing unit to which said stations, said transportation means, said weighing means and said recognition means are slaved,
   said first topping station comprising a counter in which the food is prepared manually, and a selection counter of the ingredients to be cooked that can be freely accessed by the customers,
   a first conveyor that transports the dough portions from said preparation station towards said first topping station, a sorting device positioned downstream of said first conveyor, that selectively sends the dough portions (P) towards said counter in which the food is prepared manually, or towards said selection counter, in relation to the selection made by the customer, a second conveyor and a third conveyor, which transport the dough portions, selected by said sorting device, respectively towards said counter in which the food is prepared manually, or towards said selection counter.

2. The system according to claim 1, wherein said preparation station comprises at least one kneading machine, warming cabinets and proving chambers and at least one sheeting machine.

3. The system according to claim 1, wherein said automated selection station comprises at least one user interface through which the customer can define the characteristics of the requested food.

4. The system according to claim 1, wherein said cooking station comprises at least one conveying tunnel oven.

5. The system according to claim 1, wherein said identifiable elements comprise barcodes.

6. The system according to claim 1, wherein said weighing means comprise a second weighing station positioned downstream of said cooking station.

7. The system according to claim 6, comprising at least one second topping station with ingredients to be used after cooking.

8. The system according to claim 7, wherein said weighing means comprise a third weighing station positioned downstream of said second topping station.

* * * * *